E. E. GRAHAM.
SURVEYING INSTRUMENT.
APPLICATION FILED MAY 12, 1910.
1,023,373.
Patented Apr. 16, 1912.
3 SHEETS—SHEET 1.
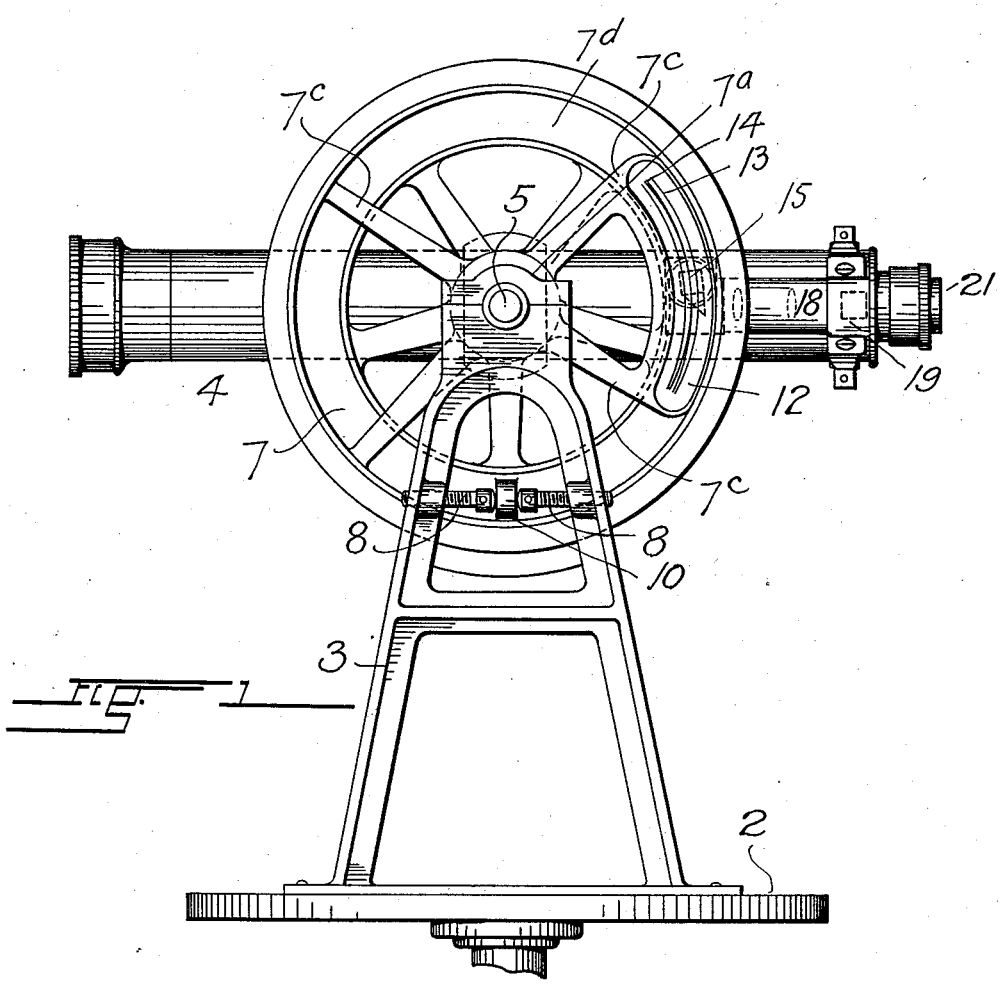
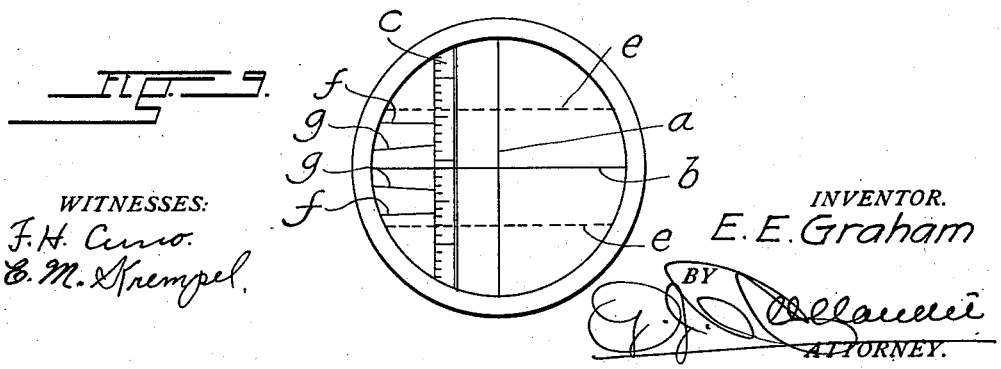
WITNESSES:
INVENTOR.
E. E. Graham
BY
ATTORNEY.

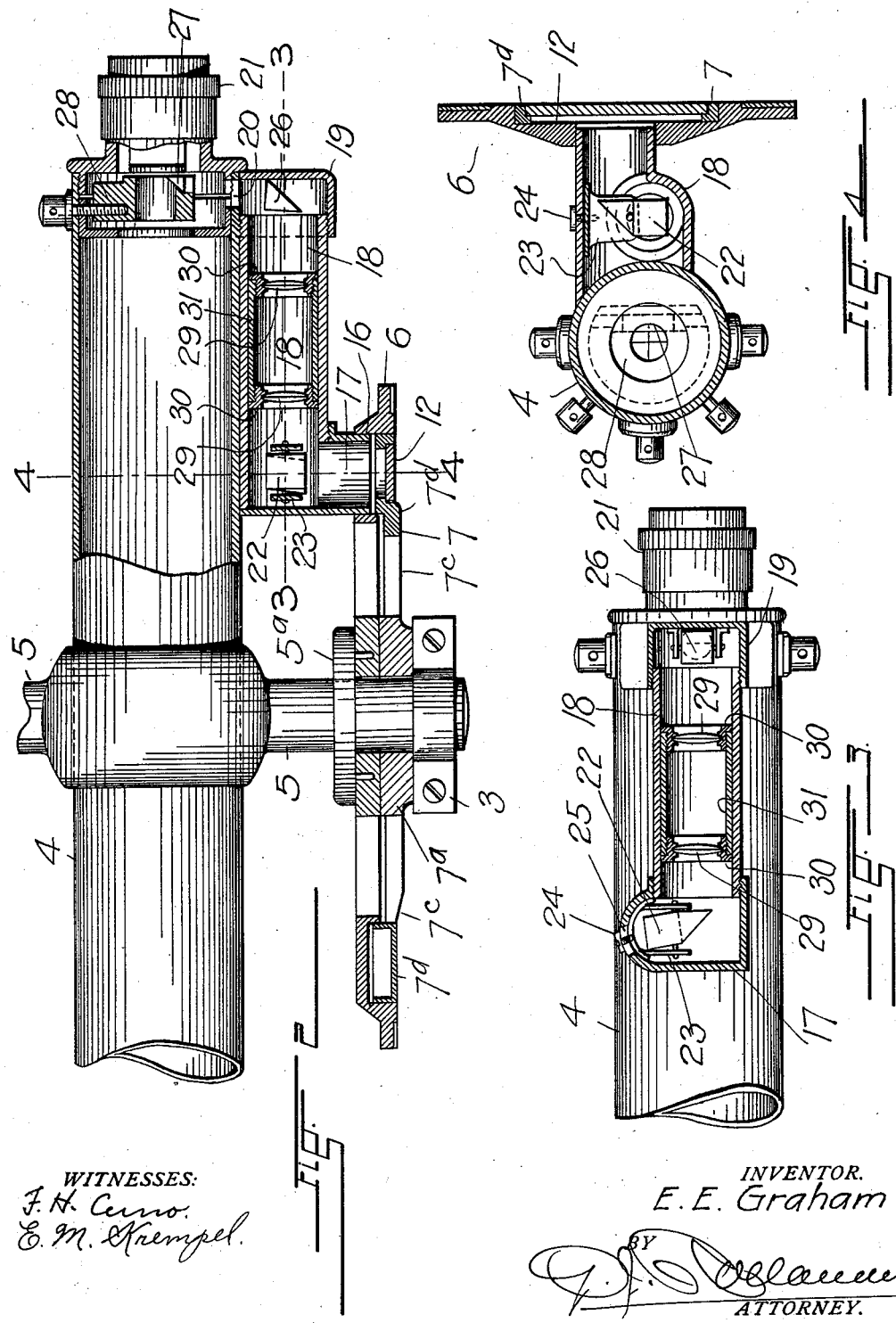

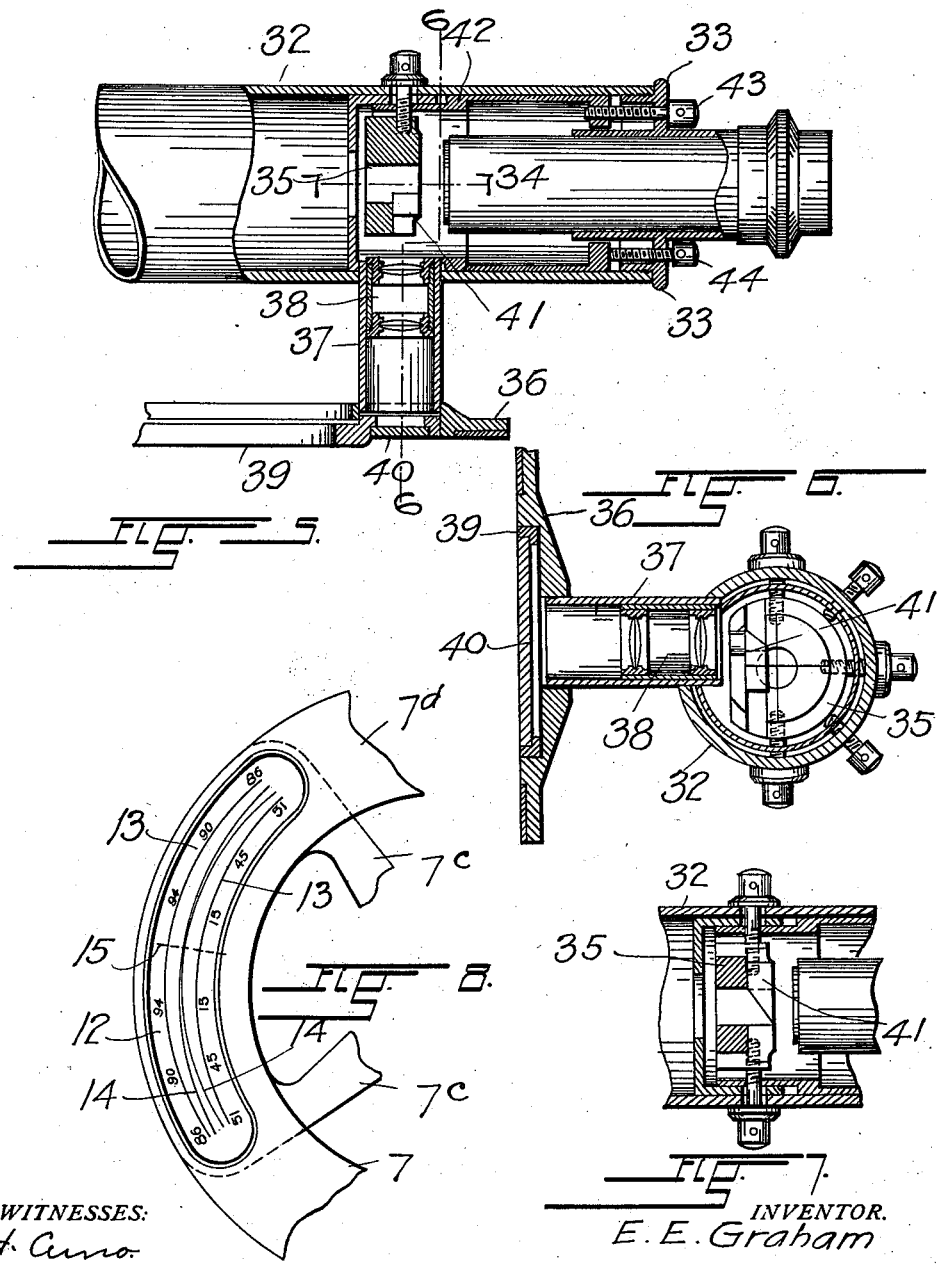

UNITED STATES PATENT OFFICE.

EMERY E. GRAHAM, OF DENVER, COLORADO.

SURVEYING INSTRUMENT.

1,023,373. Specification of Letters Patent. Patented Apr. 16, 1912.

Application filed May 12, 1910. Serial No. 560,863.

*To all whom it may concern:*

Be it known that I, EMERY E. GRAHAM, a citizen of the United States of America, residing at Denver, in the county of Denver and State of Colorado, have invented certain new and useful Improvements in Surveying Instruments, of which the following is a specification.

This invention relates to certain new and useful improvements in surveying instruments of the stadia type and its object resides in the provision of an appliance of simple construction by means of which the horizontal distance and the difference in elevations between the instrument and a stadia rod may be determined directly by readings on the rod, and without reference to the angle of inclination and computation tables.

With the stadia instruments at present in use, the intercept, that is the space read on the rod between the stadia-hairs when the telescope is inclined, denotes 1/100 of the diagonal distance between the instrument and the rod or with other words, the distance measured along the line of collimation of the telescope, and the true distance measured along a horizontal line, or the vertical distance, *i. e.* the difference in elevation between the instrument and the rod, can be determined only by a calculation in which the said intercept and the angle of inclination of the telescope are factors.

The formulas most frequently employed are for the horizontal distance $$H = i \cos.^2 A + C \cos. A$$

and for the vertical distance $$V = i \tfrac{1}{2} \sin. 2A + C \sin. A$$

in which A=the angle of inclination of the telescope read on the vertical circle, $i$=the intercept, and C=the constant for the instrument.

In my invention the above mentioned calculations are eliminated by automatically varying the distance between the stadia lines in the field of the telescope to correspond to the angle of inclination of the latter, the said distances having been previously determined for each angle by the formulas hereinbefore referred to. I provide, to this end, a surface which is stationary with relation to the telescope and upon which two sets of linear curves extend oppositely from a central zero line.

A refractive appliance rigidly connected with the telescope, has a sight which when the latter is in its horizontal position, extends opposite to the above mentioned line of zero and which when the telescope is rotated about its transverse axis, moves from the said line along the curved lines extending oppositely therefrom.

The refractive appliance is constructed to project an image of the portion of the stationary surface opposite its sight, into the field of the telescope and inasmuch as the spaces between the curved lines at consecutive points of distance from the line of zero vary in accordance with the different angles of inclination with which the said points agree, the space between the images of the lines and, in consequence, the intercept on the rod viewed through the telescope will vary proportionately. The stadia curves on the stationary surface, are arranged in two pairs, the outer ones of which converge from the zero line and are designed to correctly designate the horizontal distances between the instrument and the rod, while the inner ones diverge from the said line and denote the vertical distances or differences in elevation. The distance between the outer curves at the zero point, hereinafter called the "curve interval" corresponds with the stadia interval although it is not necessarily equal thereto and the said outer curves are constructed so that the distance between them at any given point is equal to the curve interval multiplied by $\cos.^2 A$, where A is the angle through which the sight of the refractive appliance must move in traveling from the zero line to the given point. The construction of the inner curves which are designed to denote vertical distances between the instrument and the rod, is similar to that for the outer curves, the distance between them at any given point being equal to the curve interval multiplied by $\tfrac{1}{2} \sin. 2A$, where A is the same as above. It will be understood that the stadia interval above referred to is the distance between the stadia hairs as at present employed.

In addition to the lines above described, I denote upon the surface upon which they are delineated, at consecutive points, two series of numerals which respectively designate the values of the constants to be added to the horizontal and vertical distance for the angles of inclination with which said points agree, so that the said numerals will be projected into the field together with the portions of the lines opposite to which the sight of the refractive appliance is disposed. The values of the constant for the different angles are determined as usual by multiplying the constant with the cosine of the respective angle for the horizontal distance and with the sine of the angle for the vertical distances. It will be understood that the convergent and divergent lines as well as the series of numerals are constructed reversely at opposite sides of the line of zero to adapt the instrument for stadia readings at both higher and lower elevations.

An embodiment of my invention is illustrated in the accompanying drawings in the various views of which like parts are similarly designated and in which—

Figure 1, represents a side elevation of a surveying instrument with a telescope of the inverting type, equipped with my appliance. Fig. 2, a fragmentary, partially sectional plan view of the telescope and adjacent parts comprised in said instrument, Fig. 3, a section taken along the line 3—3 Fig. 2, Fig. 4, a transverse section taken along the line 4—4 Fig. 2, Fig. 5, a fragmentary section similar to Fig. 2 showing the method of applying my invention to an instrument having a telescope of the erecting type. Fig. 6, a transverse section along the line 6—6 Fig. 5, Fig. 7, a section taken along the line 7—7 Fig. 5, Fig. 8, an enlarged view of the surface upon which the stadia curves and constant values are drawn or engraved and Fig. 9, a view of the field of the telescope showing the appearance of the image of the curves and numerals relative to a stadia rod.

Referring to Figs. 1 to 4 inclusive, let the reference numeral 2 designate the normally horizontal vernier plate of a surveying instrument and 3 the standards between which a telescope 4 of the inverting type is rotatably supported by means of trunnions 5. Loosely mounted upon one of the trunnions within an annular depression of the vertical circle 6, is a circular element 7 which is adjustably held against rotation by two opposite, axially alined screws 8 which are operatively connected with the adjacent standard 3, to engage opposite sides of a lug 10 which projects outwardly from the said element. The latter comprises a hub $7^a$ which, by means of spokes $7^c$, connects with an annular rim $7^d$ of which the lug 10 forms part and which is provided with a segmental opening before which a correspondingly shaped plate 12 is fixedly secured. Engraved, drawn or otherwise produced upon the inner surface of the plate 12, are the stadia curves and constant values, the former of which are, as hereinbefore described, arranged in two pairs, while the numerals are disposed in two series between the outer lines and the edges of the plate. The convergent members of the outer pair of lines which are designed to designate the horizontal distances between the instrument and the stadia rod are in the drawings, indicated by the reference character 13, while the inner, divergent lines which are adapted to determine the vertical distances, are designated by the numeral 14 and the line of zero from which the curves proceed in opposite directions, by the numeral 15 (see Fig. 8).

While the plate 12 may be composed of any suitable material, it is preferably made of ground glass, for which reason the curves and numerals which are produced upon its inner surface, have been drawn in full lines in Fig. 1. The vertical circle 6, which, as usual, is rigidly secured to a collar $5^a$ on the adjacent trunnion 5, is formed with a circular opening 16, which when the telescope is in a horizontal position, is axially alined with the center of the zero line 15 on the plate 12. Fitted within the opening 16, is the extremity of a laterally projecting branch 17 of a tube 18 which is secured alongside the telescope 4 parallel to its axis, and whose opposite end is closed by a cap 19 which at its innermost side, is open to connect with an opening 20 formed in the side of the telescope in proximity to its eyepiece 21. Disposed in the line of intersection of the vertical planes passing through the axes of the tube 18 and the therewith connected branch 17, is a double prism 22, the upper and lower refracting surfaces of which respectively intersect the axes of the said branch, and of the tube 18. The prism 22 is fixedly mounted in a U-shaped hanger 23, which is adjustably secured against the inner surface of the branch 17 by means of a screw 24 which projects through a slot 25, in the wall of the said branch, into a correspondingly threaded aperture in the hanger. A prism 26, is secured within the cap 19 with one of its faces opposite to the lower refracting face of the double prism 22 while another face is disposed opposite the opening 20 in the telescope and in alinement with a face of a third prism 27 which being disposed in the field of the telescope is, for convenience, secured in a correspondingly shaped slot in the reticle 28. Interposed between the prisms 22 and 26, is a double lens which serves to form the image of the portion of the plate 12 opposite the orifice of the branch 17, which by means of the combination of prisms, is projected into the field. The members 29 of the double lens are separately mounted in cells 30 detachably secured at the opposite ends of a sleeve 31 which is slidably fitted in the tube 18. The sleeve 31 into which the cells 30 are removably fitted, forms a convenient medium for the adjustment of the focal length of the lens combination, for not only can the position of the sleeve be varied with relation to the tube but the distance between the lenses may be readily lessened by reducing the length of the sleeve.

The form of my invention illustrated in Figs. 5 to 7 inclusive, is particularly adapted for use on surveying instruments having telescopes of the erecting type. The telescope 32 of the instrument has in one of its ends, a relatively stationary head 33 in which the eye piece 34 is fitted and a reticle 35 is disposed opposite a circular opening in the side of the telescope, which is axially alined with a similar opening in the vertical circle 36. The two openings are connected by a tube 37 in which a double lens 38, identical in construction with the one hereinbefore described, is slidably fitted. The construction and arrangement of the circular element 39 and the therewith connected plate 40 is similar to that described for the form illustrated in Fig. 2 and the opening in the vertical circle, which constitutes the sight of the refractive appliance, is disposed opposite the line of zero of the stadia lines on the said plate, when the telescope is in the horizontal position. A double prism 41, disposed in a correspondingly shaped groove in the recticle 35, serves to reflect an image of the portion of the stadia lines opposite the opening in the vertical circle 36, into the field of the telescope. To adjust the position of the prism 41 relative to the line of collimation of the lens for the purpose of centering the image relative to the horizontal cross-hair of the instrument, I have mounted the reticle 35 in the end of a sleeve 42 which being slidably fitted in the telescope 32, may be adjusted longitudinally with relation thereto, by the use of two screws 43 and 44 which being operatively connected with the head 33, and the sleeve 42, are respectively adapted to move the latter in opposite directions.

In assembling the parts comprised in my invention, the position of the double prism 22 in the inverting instrument or of the prism 41 in the erecting instrument, is adjusted by the means provided to that purpose as hereinbefore described, until the image of the portion of the stadia lines opposite the sight of the refractive appliance, is centered in the field of the telescope or with other words, until the stadia lines comprised in each pair are projected in the field at equal distances from the horizontal cross-hair. If the curve interval is larger or smaller than the stadia interval, the distance between the lenses or their position in the carrying tube relative to the stationary surface, is adjusted until the distance between the images of the lines which determine the curve interval, gives the correct rod intercept when the instrument is in the zero position. By rotating the plate 12, by means of the adjusting-screws 8, the image of the zero line of the curves, is moved to coincide with the vertical edge of the prism in the field of the telescope when the line of collimation of the latter is horizontal.

In Fig. 9 of the drawings, which represents the field of the telescope while an inclined sight is being taken, the reference characters a and b designate the vertical and horizontal cross-hairs, c the portion of the stadia rod viewed through the telescope, e and e the position of the ordinary stadia hairs, and f—f and g—g the image of the stadia curves which respectively indicate on the rod, the horizontal and vertical distances between the latter and the instrument. It will be observed that the image is projected to one side of the center of the field for the purpose of leaving the latter clear for ordinary sighting, and that by the use of the double prism, the image is projected into the field in a horizontal position while the lines on the plate are vertical.

While, by reason of simplicity in construction of the refractive appliance, the production of an inverted image is preferable, it will be understood that, if so desired, it may be arranged to project the image in an erect position.

As the operation of my improved instrument does in no way vary from that of stadia instruments of ordinary construction and the advantages derived from my invention as well as the method of determining the vertical and horizontal distances, have been fully explained in the first part of this specification, no further description is deemed necessary at this point and I wish it understood that while I have shown and described my invention in the best form at present known to me, variations in the construction and arrangement of the various parts may be availed of within the principle of the invention.

What I claim and desire to secure by Letters Patent is:—

1. In a surveying instrument, the combination with the rotatory telescope, of a relatively stationary element, and a refractive appliance movable with the said telescope, and having a sight opposite a surface of the said element, the said appliance being constructed to project an image of the portion of the said surface, opposite the sight, in the field of the telescope, and the said surface bearing lines which vary in position at consecutive points in the path of the sight, in accordance with the corresponding angles of inclination of the telescope, said lines being equidistantly disposed at opposite sides of an imaginary circular line.

2. In a surveying instrument, the combination with the rotatory telescope, of a relatively stationary element and a refractive appliance movable with said telescope and having a sight opposite a surface of the said element, the said appliance being constructed to project an image of the portion of the said surface, opposite the sight, in the field of the telescope and the said surface bearing lines which from a point opposite to the sight when the telescope is in a horizontal position, vary in spacing at consecutive points in the path of the sight, in accordance with the corresponding angles of inclination of the telescope, said lines being equidistantly disposed at opposite sides of an imaginary circular line.

3. In a surveying instrument, the combination with the rotatory telescope, of a relatively stationary element and a refractive appliance movable with said telescope and having a sight opposite a surface of the said element, the said appliance being constructed to project an image of the portion of the said surface, opposite the sight, in the field of the telescope, and the said surface bearing two pairs of lines which from a zero line opposite to the sight when the telescope is horizontal, vary in spacing at consecutive points in the path of the sight, in accordance with the corresponding angles of inclination of the telescope, the lines of one pair being convergent while those of the other diverge from the zero line and the lines comprised in each pair being equidistantly disposed at opposite sides of an imaginary circular line.

4. In a surveying instrument, the combination with the rotatory telescope, of a relatively stationary element and a refractive appliance movable with said telescope and having a sight opposite a surface of the said element, the said appliance being constructed to project an image of the portion of the said surface opposite the sight in the field of the telescope and the said surface bearing lines which from a point opposite to the sight when the telescope is in a horizontal position, vary in spacing at consecutive points in the path of the sight, in accordance with the corresponding angles of inclination of the telescope, and numbers placed alongside said lines at consecutive points in the path of the sight and respectively denoting the values of the constants for the angles with which said points correspond.

5. In a surveying instrument, the combination with the rotatory telescope, of a relatively stationary element, a refractive appliance including a lens and a prism, movable with the said telescope, the said appliance having a sight opposite a surface of said element and constructed to project an image of the portion of the surface opposite the sight in the field of the telescope, and the said surface bearing lines which vary in spacing at consecutive points in the path of the sight, in accordance with the corresponding angles of inclination of the telescope and means for adjusting the position of the said prism whereby the said image may be centered relative to a determinate line in the field.

6. In a surveying instrument, the combination with the rotatory telescope, of a relatively stationary element, a refractive appliance including a lens and a prism, movable with the said telescope, the said appliance having a sight opposite a surface of said element, and constructed to project an image of the portion of the surface opposite the sight, in the field of the telescope, the said surface bearing lines which vary in spacing at consecutive points in the path of the sight, in accordance with the corresponding angles of inclination of the telescope, and the said lens being adjustable relative to the said line bearing surface whereby the size of the said image may be varied.

7. In a surveying instrument, the combination with the rotatory telescope, of a relatively stationary element, a refractive appliance including a double lens and a prism, movable with the said telescope, the said appliance having a sight opposite a surface of said element, and constructed to project an image of the portion of the surface opposite the sight, in the field of the telescope, the said surface bearing lines which vary in spacing at consecutive points in the path of the sight, in accordance with the corresponding angles of inclination of the telescope, the said lens being adjustable relative to the said surface, and the said members being adjustable for varying the distance between them, for the purpose set forth.

8. In a surveying instrument the combination with its rotatory telescope and a therewith connected supporting frame, of a relatively stationary element adjacent the latter, a tube connected with said telescope one of its extremities being secured in the said frame opposite a surface of the said stationary element, a refractive device in the said tube adapted to produce an image of the portion of the said surface opposite the said extremity, and a reflector disposed relative to the said device for projecting said image in the field of the telescope, the said surface bearing lines which vary in spacing at consecutive points in the path of the extremity of the said tube, in accordance with the corresponding angles of inclination of the telescope.

9. In a surveying instrument the combination with its rotatory telescope and a therewith connected supporting frame, of a relatively stationary element adjacent the latter, a tube connected with said telescope one of its extremities being secured in the said frame opposite a surface of the said element, a refractive device in the said tube adapted to produce an image of the portion of the said surface opposite the said extremity, a reflector disposed relative to the said device for projecting said image in the field of the telescope, and means for adjusting the angular position of the said element on its axis, the said surface bearing lines which vary in spacing at consecutive points in the path of the extremity of the said tube, in accordance with the corresponding angles of inclination of the telescope.

10. In a surveying instrument, the combination with the rotatory telescope, of a relatively stationary element and a refractive appliance movable with said telescope and having a sight opposite a surface of said element, the said appliance being constructed to project an image of the portion of the said surface opposite the sight in the field of the telescope and the said surface bearing at consecutive points in the path of the sight, numbers which respectively denote the values of the constants for the angles with which said points correspond.

In testimony whereof I affix my signature in presence of two witnesses.

EMERY E. GRAHAM.

Witnesses:
  G. J. ROLLANDET,
  ROBT. G. AINSWORTH.

---

Copies of this patent may be obtained for five cents each, by addressing the "Commissioner of Patents, Washington, D. C."